Oct. 2, 1951     F. H. KORTZ     2,569,768
DEVICE FOR FORMING FISHING LEADERS
Filed Oct. 4, 1947
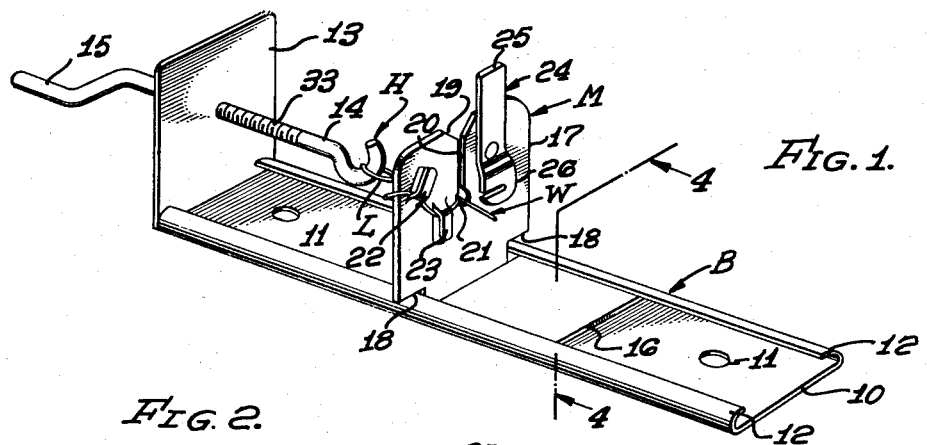
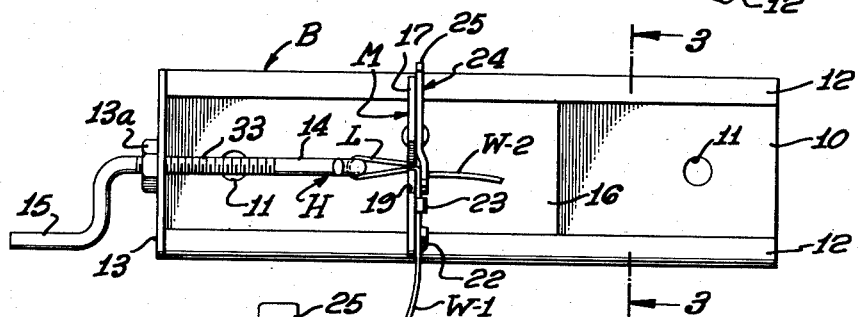
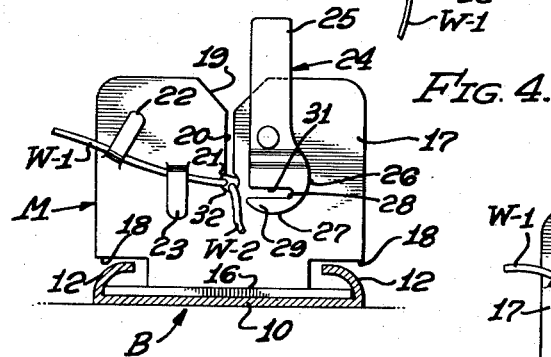
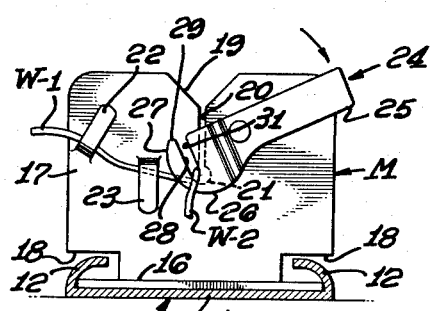
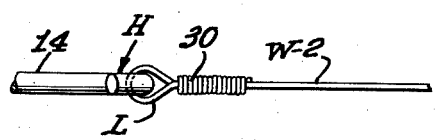
INVENTOR.
FRANK H. KORTZ
BY
ATTORNEY.

Patented Oct. 2, 1951

2,569,768

UNITED STATES PATENT OFFICE 2,569,768

DEVICE FOR FORMING FISHING LEADERS

Frank H. Kortz, Long Beach, Calif.

Application October 4, 1947, Serial No. 777,890

1 Claim. (Cl. 140—102)

My invention relates to the field of fishing equipment, and more particularly to a device adapted for forming loops on the ends of metallic fishing leaders.

In the art of angling the hook on which the bait is mounted can be supported from the line the fisherman is using in several different ways. One of the most common methods of affixing a hook to a line and also the most convenient is to thread the fishing line directly through the eye provided in the shank of the hook. However, this manner of supporting a hook from a line has the disadvantage that the line when immersed in the water is opaque, and due to the acute vision of fish may serve to warn them from taking the bait. To overcome this difficulty a transparent gut leader is sometimes used as an intermediate connection between the hook or lure and the line of the angler. Although this type of leader performs satisfactorily under certain conditions it is of little value when the fish liable to be taken have teeth or a hard bony mouth structure such as muskellunge, barracuda, tuna, albacore and bonita which permit them to sever the gut leader.

To prevent fish in the above class from escaping after being hooked by biting through a gut leader, a leader is used which is preferably formed from a high grade steel or German silver. It will be apparent that when a hook is affixed to a conventional linen line directly or to a gut leader little difficulty is experienced in forming a loop therein adapted for holding same, but that in the case of a metallic wire leader this is a troublesome problem. In the past the average fisherman has resorted to purchasing prefabricated metallic leaders with the loops formed therein, as the equipment for forming such loops in a satisfactory manner is rather complicated, bulky and cumbersome, and designed for stationary use by a manufacturer who is interested in producing leaders in volume. Thus, while prefabricated leaders are available on the market many fishermen are unsatisfied with the product as they are restricted to metallic leaders of certain lengths and weights, rather than being able to use leaders which are adapted to their own particular mode of fishing.

It is therefore a major object of my invention to provide a device that will form a loop of the desired length on the free ends of a piece of metallic leader wire, that will be extremely simple in mechanical structure, can be manually operated, will be light in weight and small in size, can be carried by a fisherman on a trip, will be inexpensive to manufacture, and can be retailed in the low priced sporting goods merchandising field.

These and other objects and advantages of my invention will become apparent from the following description of a preferred form thereof, and from the drawing illustrating that form in which:

Fig. 1 is a perspective view of my device for forming a fishing leader;

Fig. 2 is a plan view of the device;

Fig. 3 is a vertical cross-sectional view of the device with the wire engaging lever in the closed position taken on the line 3—3 of Fig. 2;

Fig. 4 is a vertical cross-sectional view of the device with the wire engaging lever in the open position taken on the line 4—4 of Fig. 1; and Fig. 5 is a plan view of the loop formed in the leader wire by the use of the device.

Referring now to Fig. 1 for the general arrangement of my invention, it will be seen that my device for forming a fishing leader includes an elongated base B that slidably supports a vertical wire engaging member M for the leader wire W during the time that a loop L is being formed therein by the manual rotation of a horizontally positioned hook H.

The base B is preferably formed from an elongated rectangular strip of sheet metal 10 that is provided at each end with a circular opening 11 which is used in affixing the completed device to a suitable flat structure by the use of a screw or bolt. Each longitudinal side of the strip 10 is bent inwardly to form a lip 12 that serves as a guide for the wire supporting member M. Formed on one end of the base B is a substantially vertical plate 13, preferably having a rectangular shape, that is provided on its forward face with a boss 13a which is formed with a tapped bore therein that engages the threaded portion of a shaft 14. Although the plate 13 and boss 13a can be formed as an integral unit, I have found it desirable to fabricate this portion of the device by affixing a machine nut to the plate 13 to form the boss 13a. The forward portion of the shaft 14 is provided with a forwardly extending L-shaped member 15 which serves as a crank for rotating the hook H which is formed on the rearward end of the shaft. It will be noted in Fig. 1 that as the crank 15 is turned that the hook H is not only rotated but is moved either forwardly or rearwardly depending on the direction in which the crank is rotated.

In Figs. 2 and 3 it will be seen that the wire supporting member M is fabricated with a rectangular sheet metal base 16 that is slidably mounted on the upper surface of the base 10, and is held thereon by each of its longitudinal edges being within the confines of one of the lips 12. Formed on the forward edge of the base 16 is a substantially vertical rectangular plate 17 that is provided at each of its lower corners with an indentation 18 through which one of the lips 12 extends, and on its upper edge with a centrally disposed V-shaped notch 19. Extending downwardly from the lower apex of the notch 19 is a vertical slot 20 having a width that will permit wire W of the largest cross-section which will be used in forming leaders to pass therethrough. The lower end of the slot 20 terminates in a circular bore 21 having a diameter slightly greater than twice the width of the slot 20 in order that the two lengths of wire W necessary to form a loop L can be inserted therein as best seen in Fig. 3.

Formed on one side of the slot 20 on the rearward upper portion of the plate 17 are two outwardly extending wire engaging arms 22 and 23 respectively, with the arm 22 projecting upwardly and the arm 23 downwardly. It will be noted that the portion of each of the arms 22 and 23 closest to the plate 17 is tapered to place tension on wire W of various diameters that will pass therethrough while the upper portion of each of the arms is parallel to the plate 17. From experience I have found that the arms 22 and 23 are preferably formed by a stamping operation in which the U-shaped arm portions are bent into the necessary shape.

Situated on the rearward face of the plate 17 on the side opposite the wire engaging arms 22 and 23 is a pivotally mounted lever 24 that is formed on its outer end with a handle 25, and on the inner end with an enlarged portion 26. The lever portion 26 is formed with a lower semi-circular edge and an outer slightly curved laterally extending edge 27 that is substantially normal to the handle portion 25. Extending inwardly into the lever portion 26 is a transverse slot 28 adjacent the lower edge 27 and forming therewith an arm 29 which is spaced slightly from the plate 17 to frictionally engage the wire W-1 as it passes from the wire engaging member 23 prior to entering the bore 21 as can best be seen in Fig. 2. The free end of wire W which for convenience is designated as strand W-1 passes through the members 22 and 23, the bore 21, and around the hook H whence it returns as a second strand W-2 through the bore 21 in a position to be engaged by the slot 28 as the lever 24 in which the slot is formed is rotated clockwise. Thus, as the hook H is rotated by the use of the crank 15 the wire W-1 is pulled forwardly against the tension offered by passing between the interior face of the arm 29 and the rearward surface of the plate 17, as well as that offered by the wire engaging members 22 and 23, to be tightly wound into a shank portion 30 of the loop L. The second strand of wire W-2 is firmly held in a stationary position within the confines of the slot 28 and the bore 21 which are slightly offset from one another in order that a firm grip will be secured on the wire W-2 when the lever 24 is rotated to a wire engaging position.

The operation of my device is extremely simple and it can be operated in either a fixed or portable position. Should the former position be found desirable, the device is placed on a flat rigid structure, and attached thereto by extending screws or bolts through the openings 11 into the body of the structure. The shaft 14 is rotated with the crank 15 until it is moved horizontally into a position in which the plate 13 is located near the forward end of the threaded portion 14. Plate 17 is now moved horizontally until the distance between the end of the hook H and the forward face of the plate is the distance desired in the finished loop L. The wire W prior to a loop being formed therein is threaded into my device by extending the outer end portion W-1 through the wire engaging members 22 and 23, down through the slot 20 into the bore 21, and forwardly around the hook H; the second strand of wire W-2 is returned from the hook H by being moved down through the slot 20 into the bore 21 where it is engaged by the slot 28 as the lever handle 25 is rotated downwardly. It will be noted that while the bore 21 and the slot 28 are of substantially the same width they are slightly offset from one another in order that when the slot 28 is moved upwardly the wire W-2 will be gripped between the outside edges 31 and 32 of the bore 21 and slot 28 respectively, and held in a stationary position therebetween until the lever handle 25 is moved upwardly. During the time that the wire W-2 is locked in position between the edges 31 and 32 the wire portion W-1 is held under tension just before entering the bore 21 by being engaged on one side by the rearward face of the plate 17 and on the opposite side by interior surface of the lever arm 29.

The crank 15 is now rotated with one hand and the wire supporting member M held in a firm position with the other hand, preferably by applying pressure with the thumb to the base 16. As rotation of the hook H occurs, the strand of wire W-1 is drawn against the frictional resistance of the wire engaging members 22 and 23, as well as the friction offered by passing between the plate 17 and the arm 29, to be wound in a tight coil to form the shank portion 30 of the loop L as best seen in Fig. 5. From experience I have found that all of the wire W-1 can be wound to form the shank portion 30, and that the winding will continue satisfactorily until the very end portion of the wire W-1 has been used. It will be apparent that as the hook H is moved horizontally forward by each rotation of the handle 15 that the pitch of the threaded shaft portion 33 must be greater than the cross sectional diameter of the largest wire W that will be used in forming leaders in order that a smooth shank portion 30 will be secured with the heaviest wire.

Upon completing the formation of the loop L the lever 24 is returned to the open position as shown in Fig. 1, and the leader removed from the slot 20 of my device ready for use, or for having another loop L formed on the opposite end of the wire W in the above described manner. From the standpoint of appearance and sales appeal I have found it desirable to plate the component parts of the device with cadmium, chromium or nickel.

While the device herein shown and described is fully capable of achieving the objects and providing the advantages hereinbefore stated it is to be understood that it is merely illustrative of the presently preferred form of my invention, and that I do not mean to limit myself to the details of construction or design herein shown other than as defined in the appended claim.

I claim:

A device for forming a fishing leader which includes: an elongated rectangular base provided with inwardly extending lips along each longitudinal side thereof; an upright support, provided with a substantially horizontal tapped bore, affixed to one end of said base; a base plate slidably mounted on said base within the confines of said lips; a substantially vertical member mounted on said base, and provided with a substantially vertical slot that terminates at the bottom thereof in a circular bore having a diameter slightly greater than twice the cross-sectional diameter of the largest leader wire that will be used with said device; a plurality of wire engaging arms provided on said member, with each of said arms having a tapered base portion whereby wire passing therethrough will be held under tension; a lever pivotally mounted on said member on the side opposite from said wire engaging arms, with said lever being provided with a slot that is slightly offset from said slot provided in said member when said lever is in a wire engaging position, and the inner portion of said lever being extended outwardly from the surface of said member; a threaded shaft rotatably mounted in said bore and provided with a hook on its rearward end; and a handle adapted for rotating said shaft whereby said hook can engage the doubled free end portion of a piece of leader wire extending through said bore and rotate and advance said doubled wire portion to form a loop therein during the time that the free strand of wire is held in tension by said wire engaging arms and the outwardly extending portion of said lever, while the other strand of said wire is held in a fixed position between the sidewalls of said slots provided in said member and said lever.

FRANK H. KORTZ.

REFERENCES CITED

The following references are of record in the file of this patent:

UNITED STATES PATENTS

| Number | Name | Date |
|---|---|---|
| Re. 11,201 | Flatan | Nov. 3, 1891 |
| 740,444 | Lamb | Oct. 6, 1903 |
| 769,023 | Rossi | Aug. 30, 1904 |
| 874,934 | Broome | Dec. 31, 1907 |
| 911,931 | Ambruster | Feb. 9, 1909 |
| 1,014,498 | Lung | Jan. 9, 1912 |
| 1,213,643 | Hoett | Jan. 23, 1917 |
| 1,238,445 | Scholl | Aug. 28, 1917 |
| 1,307,409 | Matthews | June 24, 1919 |
| 1,310,791 | Cogozzo | July 22, 1919 |
| 1,320,949 | Wikowsky | Nov. 4, 1919 |
| 1,646,550 | Miller | Oct. 25, 1927 |
| 1,752,726 | Brannaka | Apr. 1, 1930 |
| 2,236,503 | Heidrich | Apr. 1, 1941 |
| 2,242,341 | Brignall | May 20, 1941 |
| 2,253,983 | Renier | Aug. 26, 1941 |